United States Patent [19]
Ware, Jr.

[11] 3,710,501
[45] Jan. 16, 1973

[54] RELEASABLE TROLLING WEIGHT

[76] Inventor: Richard S. Ware, Jr., 5001 Seminary Road, Apt. 1600, Alexandria, Va. 22311

[22] Filed: Nov. 4, 1971

[21] Appl. No.: 195,715

[52] U.S. Cl.................................43/43.11, 43/44.88
[51] Int. Cl.........................A01k 93/00, A01k 95/00
[58] Field of Search................43/44.88, 43.15, 43.11

[56] References Cited

UNITED STATES PATENTS

| | | | |
|---|---|---|---|
| 1,943,192 | 1/1934 | Semar | 43/44.88 |
| 2,536,414 | 1/1951 | Beard | 43/43.11 |
| 2,596,269 | 5/1952 | Metzger | 43/43.11 |
| 2,760,295 | 8/1956 | Bond | 43/43.11 |

*Primary Examiner*—Louis G. Mancene
*Assistant Examiner*—Daniel J. Leach
*Attorney*—Harvey B. Jacobson

[57] ABSTRACT

A strike and pull responsive drop line fastening and automatic releasing device wherein an upper end of a weighted drop line is retentively but releasably and slidingly oriented with a predetermined portion of the trolling line comprising a one piece non-corrodible adaptor characterized by a median body portion having an open ended passage for the trolling line threaded therethrough. A complemental spindle is integrally joined with an upper part of the body portion and forms an upper lever arm around which are wound a few turns of the line. A companion shank is joined with a bottom side of the body portion and forms a lower lever arm to which the drop line is releasably attached. A bridle-like guard is pivotally mounted on the body portion and includes a line receiving eye and upstanding plates which engage the sides of the upper lever arm and prevent unwinding of the line from the spindle when the guard is in closed position.

9 Claims, 5 Drawing Figures

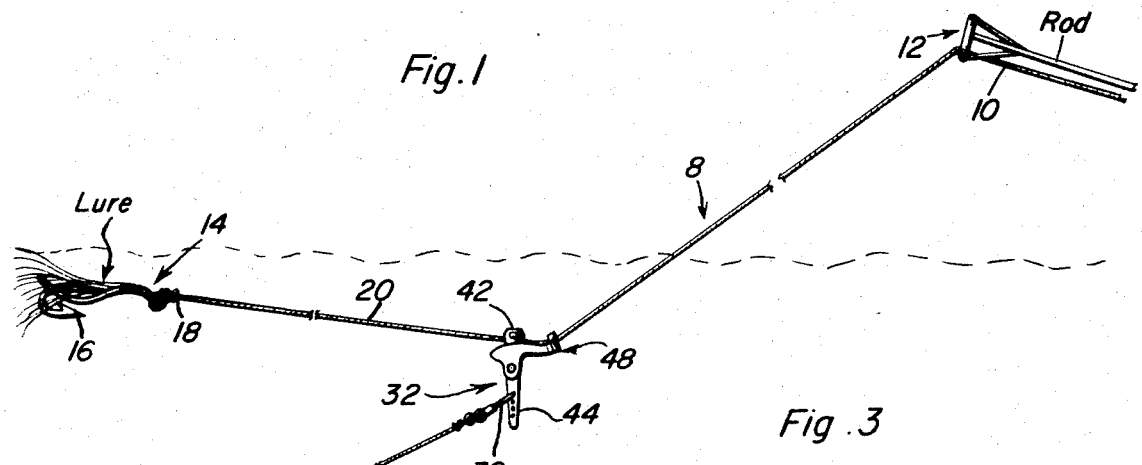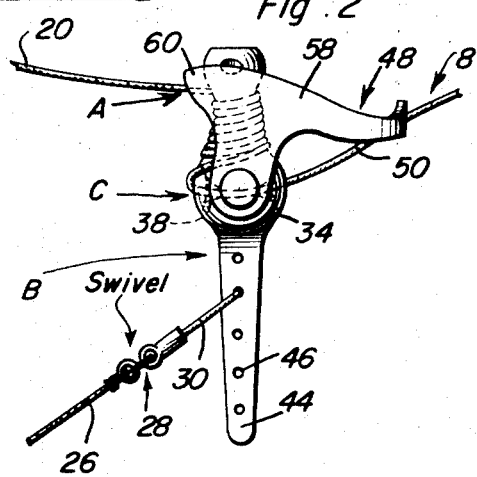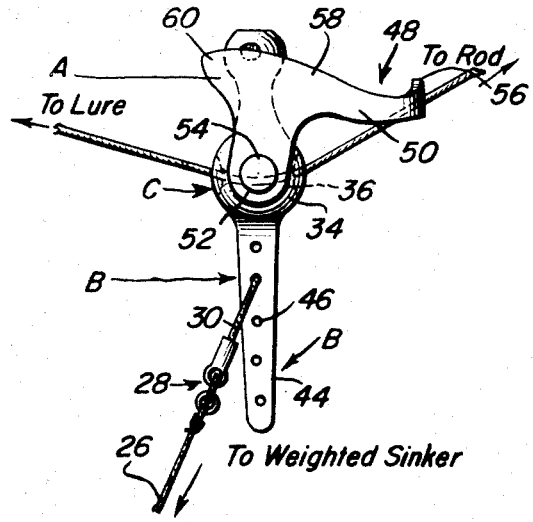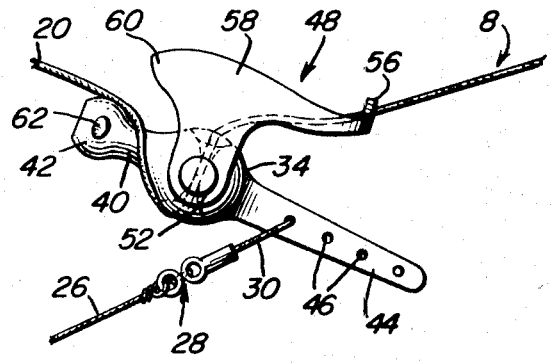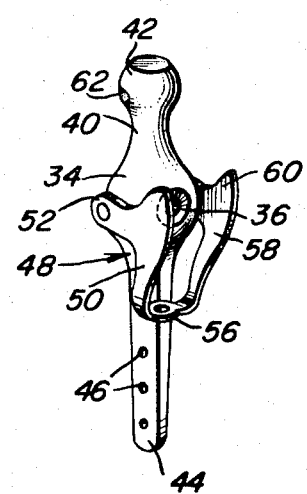

RELEASABLE TROLLING WEIGHT

The present invention relates to line attached angling devices such as are expressly designed and adapted to retentively but slidingly connect an upper end of a sinker-weighted drop line with a predetermined portion of a trolling line and has to do, more particularly, with an adaptation which functions to set and retain the drop line and its sinker in a given position but functions to automatically release on the strike of a fish.

Persons conversant with the field of invention to which the herein disclosed concept relates are aware than when trolling for certain types of fish it is common practice to affix a weight on the trolling line fifteen to thirty feet ahead of the locale of the lure. This poses a problem when retrieving a fish due to the fact that the fixedly attached weight constitutes a stop, with the result that the line between the weight and the fish must be pulled in by hand. This takes much of the fun out of fighting the fish close in. It is an object of the present invention, generally stated, to provide automatic release means, that is, means which functions to release the weighted drop line from a temporarily set or fixed position on the trolling line by the strike or pull of a fish, thus permitting the fisherman to accomplish a satisfactory full retrieve.

Many and varied prior art devices have been devised with a view toward coping with the stated problem but are thought to be complicated and limited to a specific drag of the lure or size of the weight or are designed for on-the-line weights only.

Many prior patents could, but need not be cited here as indicative of the state of the art to which the present invention relates. The reader, if so desired, may refer to the Louis Semar releasable sinker covered in U.S. Pat. 1,943,192 which has to do with the sinker connected to a fishing line in an adjusted position with the sinker capable of being released for sliding movement along the line when a pull is exerted on the lure or bait.

An object of the present invention is to advance the art and, in so doing, to provide a readily applicable and removable attachment which is such in design and construction that it well serves the purpose for which it has been devised and experimentally and successfully used.

Briefly summarized the herein disclosed concept, construed from a combination standpoint, comprises a conventional trolling line having a forward portion which is cooperatively connectable with a fishing rod, a lure, of any suitable type, carried by the rearward end portion of the trolling line, a sinker, a drop line having a lower end secured to and for supporting the sinker. Drop line attaching means is operatively suspended in a set position on the trolling line, that is, forwardly of the locale of the lure and rearwardly of the tip of the aforementioned rod. The upper end of the drop line is connected to the attaching means. The attaching means embodies a self-contained component part herein set forth as a spindle around which a strike responsive portion of the trolling line is manually wound but releasably secured and from which it is unwound and spooled off when the fish strikes, whereby to automatically release the attaching means, the drop line, and sinker from the normally set position on the trolling line.

As above revealed other and generally analogous devices with similar intent have been patented but as experience has shown have been difficult to use, are complicated or limited to a specific drag of the lure or size of the weight or are expressly designed for on-the-line weights only. By contrast, the herein disclosed device is, as experience has shown, simple to use, uncomplicated in structured design and capability, and through a lever arm principle, is adjustable for different lure drags and weights while, at the same time, permitting any practical type of sinker to be acceptably used.

In carrying out the principles of the invention, a pull responsive drop line attaching and releasing device is utilized and is characterized by a median body portion which has an open ended passage for that portion of the trolling line which is adapted to be threaded and passed through the passage. A companion spindle is integrally joined with an upper part of the body portion and provides an upper lever arm. A shank is joined with an opposite side of the body portion and provides a complemental lower lever arm. A bridle-like guard is pivotally mounted on the body portion. These two component parts may be made of non-corrodible metal but it is within the purview of the invention to construct the parts out of high strength material.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in side elevation showing an end portion of a fishing rod, the trolling line cooperable therewith, a suitable lure on the rearward or trailing end of the trolling line and the strike and pull responsive drop line fastening and automatic releasing device in a set ready-to-function but releasable position on that portion of the trolling line with which it is functionally connectible.

FIG. 2 is a view which is based on FIG. 1 and which shows the device on an appropriately enlarged scale and in a manner to bring out the constructional and oriented relationship of the pull responsive drop line attaching means and how such means is constructed and used, for example, in the manner illustrated in FIG. 1.

FIG. 3 is a view also in side elevation and which is based on FIG. 2 and wherein the drop line attaching device is tilted to a releasable position with the line spooling off the headed spindle and the pivoted guard tripped to the position shown.

FIG. 4 is a view similar in a manner of speaking to FIG. 2 but showing the released position of the overall attaching and releasing means in its slidable position.

FIG. 5 is a view in perspective of the overall device by itself.

Referring now to the views of the drawing singly and collectively and with particular reference to FIG. 1 it will be evident that the trolling line, which is conventional, is denoted by the numeral 8, said line having a forward portion 10 operatively connectible with the fishing rod 12. An artificial lure of any suitable construction is provided as at 14 and embodies a fish hook 16. This lure, which may vary in construction is appropriately connected as at 18 to the trailing or rearward end portion 20 of the trolling line. The aforementioned drop line is designated in FIG. 1 by the numeral 22, the same provided on its lower end with a sinker 24 of any appropriate shape or design and of requisite weight or mass. An upper end portion 26 of the drop line is connected to a swivel 28 embodying a readily attachable and detachable fastener 30.

It is the two-part means which is of the essence here and which, because of its uniqueness in construction and capability is deemed to be an innovation. In practice this means is operatively suspended in a set position on the trolling line forwardly of the lure and rearwardly of the tip of the rod. The upper end of the drop line, more particularly the fastener 30, is detachably and adjustably connectible with the attaching means, that is a component part thereof. Broadly this attaching means embodies and features a self-contained spindle around which a strike responsive portion of the trolling line is manually wound but releasably secured and from which it is unwound and spooled off when a fish strikes to, in this manner, automatically release the attaching means, drop line, and sinker from the normally set position shown in FIGS. 1 and 2. A principal part of this means is herein referred to as a spindle, also constitutes a one piece adaptor, and is designated by the numeral 32. Specifically, it comprises a one piece unit and is characterized in part by an enlarged body portion 34. This body portion is provided with an open ended passage 36 for that portion 38 of the trolling line which is adapted to be threaded and passed therethrough. The aforementioned spindle portion comprises a requisite neck 40 which is integrally joined with the upper part of the body portion and which terminates at its upper end in an appropriately enlarged head 42. A shank 44 has its upper end joined with an opposite bottom side of the body portion and is of requisite length and weight as well as shape and is provided with a row of holes 46 to permit detachable and adjustable connection of the aforementioned fastener 30 thereto as shown in the views of the drawings. This shank has its axis generally in alignment with the axis of the spindle portion but the configuration may be varied. For convenience of reference here the body portion in conjunction with the headed spindle portion constitutes a lever arm A oriented and coordinating with a lower lever arm B (FIG. 5) with the body portion fulcrumming generally about a fulcrum point C.

The companion or complemental component part of the overall device is designated, broadly stated, as a pivoted guard 48. In practice the guard may vary in construction. However, and as shown it comprises a one piece bridle, that is, a bridle construction which embodies a substantially U-shaped yoke whose curvate arms 50 straddle diametrically opposite sides of the body portion and have apertured terminal ends 52 (see FIG. 5) which constitute journals and are journalled for angular rotation on pins or projections 54 provided therefor on diametrically opposite sides of the body portion 34. The median bight portion of the yoke is provided with an integral line guide eye 56 and the arms 50 each have an appropriately curved plate 58 the free upper corner 60 of which overlies and lightly engages opposite side surfaces 62 provided therefor on the head of the aforementioned spindle portion. The upward force exerted by line 8 on the pivoted guard 48 keeps the guard in closed position. Also, the curved edges of the plates 58 function as a weed guard to prevent weeds from collecting on the head and neck of the spindle which would adversely affect operation of the device.

In the vertical position (FIGS. 1 and 2) the force produced by the mass and drag of the sinker on the lower arm B must equal or exceed the force produced by the drag of the lure action on the lever arm A to equalize and maintain the device in a near vertical position thereby preventing tumbling which would produce twist in the line. It may be noted that the length of the lever arm B is adjustable, making it possible to adjust for different weights in relation to lure forces. Although the length of the drop line is predicated on keeping the lure a constant distance above the bottom by "-bumping" the sinker along the bottom, a short drop line can be employed and the device used in the same fashion as an "on line" sinker where lure depth above bottom is not a factor. When a fish is hooked, the force of the strike or pull of the fish will cause the force acting through the lever arm A to exceed the force of the weight acting through the lever arm B.

The adaptor attaching device 32 will assume the inclined released position toward the lure and will permit the line to unwind, that is, the portion 9 of the line which has been wound around the neck 40, thus freeing the device for sliding in manner evident in FIG. 4.

The device is rigged as follows: The trolling line is passed first through the hole 56 in the guard, then through the hole 36 in the spindle and the lure is attached. Normally a short wire leader with swivel (not shown) is used ahead of the lure. The weight on the drop line is then attached by swivel to the lower arm of the spindle.

To use, the fisherman holds the device and strips out the line until the trolled bait is the desired distance behind the sinker and then connects the line to the neck by making a number of turns around the headed neck 40 of the spindle portion. The device with the weight is then lowered into the water and the line is payed out to the desired trolling distance. The guard (FIG. 1) keeps the line from unwinding when the weight is lowered by holding line 8 and the lines are in ready-to-function position.

A careful consideration of the views of the drawing in conjunction with the specifications will suffice to provide a comprehensive understanding of the invention and features and advantages. Accordingly, a more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination, a trolling line having a forward portion operatively connectible with a fishing rod, a lure carried by the rearward end portion of said trolling line, a sinker, a drop line having a lower end secured to and for supporting said sinker, drop line attaching means operatively suspended in a predetermined set position on said trolling line forwardly of the lure and rearwardly of the tip of said rod, the upper end of said drop line being connected to said attaching means, and said attaching means embodying a body portion having an open-ended bore extending therethrough and providing a passage through which an oriented portion of said trolling line is threaded and a self-contained spindle around which a strike-responsive portion of said trolling line is manually wound and from which it is unwound and spooled off when a fish strikes, whereby to automatically release said attaching means, drop line, and sinker from said set position.

2. The combination defined in and according to claim 1, and wherein said upper end of said drop line is detachably, adjustably and swivelly connected to said attaching means.

3. The combination defined in and according to claim 1, and wherein said spindle comprises a neck having an enlarged line retaining head on an upper end thereof.

4. The combination defined in and according to claim 1, and wherein said body portion is provided with a depending shank, the upper end of said drop line being detachably, adjustably, and swivelly connected to a selected leverage varying portion of said shank.

5. The combination defined in and according to claim 1, and a bridle-like guard mounted on said body portion, said guard having an eye through which a portion of said trolling line is slidingly threaded and also having upstanding guard plates having free terminal ends overlying the side portions of the spindle when the guard is in closed position due to the upward force exerted thereon by tension on the trolling line, the edges of said plate being curved to act as a weed guard to prevent weeds from collecting on the spindle.

6. For use in retentively but releasably connecting an upper end portion of a sinker-equipped drop line to a predetermined portion of a trolling line forwardly of the usual trailing lure, a pull responsive drop line attaching and releasing device comprising in combination, a median body portion having an open-ended passage for that portion of the trolling line which is adapted to be threaded and passed therethrough, a spindle integrally joined with an upper part of said body portion, said spindle providing an upper lever arm, a shank joined with another portion of said body portion and providing a complemental lower lever arm, and a bridle-like guard pivotally mounted on said body portion.

7. The drop line and releasing device defined in and according to claim 6, and wherein said spindle comprises a neck having an enlarged headed upper end, said neck being adapted to permit a coordinating portion of the trolling line to be manually wound thereon for subsequent bite responsive unwinding and releasing.

8. The drop line attaching and releasing device defined in and according to claim 7, and wherein said bridle-like guard comprises a U-shaped yoke having legs straddling and pivotally mounted on said body portion, an eye carried by the bight portion of the yoke and a plate on each leg of the yoke overlying the side portions of headed upper end of the neck for retaining the line wound on the neck when the guard is held in closed position by the upward force exerted on the guard by the line extending through the eye.

9. The drop line attaching and releasing device defined in and according to claim 8, and wherein said shank is oppositely arranged in relation to the spindle, and means on said shank to which an upper end of said drop line can be detachably, swivelly and adjustably connected.

* * * * *